(12) United States Patent
Flessas

(10) Patent No.: US 7,545,108 B2
(45) Date of Patent: Jun. 9, 2009

(54) ROBOTICALLY CONTROLLED DISPLAY

(76) Inventor: Andy Flessas, 106 Fartelli Ave., Las Vegas, NV (US) 89123

( * ) Notice: Subject to any disclaimer, the term of this patent is extended or adjusted under 35 U.S.C. 154(b) by 165 days.

(21) Appl. No.: 11/700,535

(22) Filed: Jan. 30, 2007

(65) Prior Publication Data

US 2007/0177339 A1    Aug. 2, 2007

(51) Int. Cl.
*H02P 1/54* (2006.01)
(52) U.S. Cl. .................. 318/101; 318/568.25; 248/271; 361/681
(58) Field of Classification Search .............. 318/101, 318/568.25; 361/681
See application file for complete search history.

(56) References Cited

U.S. PATENT DOCUMENTS

| | | | |
|---|---|---|---|
| 5,628,660 A * | 5/1997 | Onitsuka ................ 445/24 |
| 5,708,527 A | 1/1998 | Adamson et al. |
| 5,909,998 A | 6/1999 | Herbermann et al. |
| 5,947,429 A | 9/1999 | Sweere et al. |
| 6,046,711 A * | 4/2000 | Kouchi ..................... 345/8 |
| 6,085,670 A * | 7/2000 | Genov .................. 108/147 |
| 6,212,784 B1 | 4/2001 | Pittman |
| 6,328,206 B1 * | 12/2001 | Schanz et al. ........... 235/379 |
| 6,437,973 B1 | 8/2002 | Helot et al. |
| 6,826,963 B2 * | 12/2004 | Liu et al. ................. 73/798 |
| 7,414,603 B2 * | 8/2008 | Tseng ..................... 345/87 |
| 2004/0202445 A1* | 10/2004 | DiFrancesco ........... 386/46 |
| 2006/0061124 A1* | 3/2006 | Schmidt et al. ......... 296/70 |

* cited by examiner

*Primary Examiner*—Bentsu Ro
*Assistant Examiner*—David S Luo
(74) *Attorney, Agent, or Firm*—Weide & Miller, Ltd.

(57) ABSTRACT

An electronic display configured to display visual information is mounted to a display mount. The display mount is movable in three-dimensions, whereby the associated display may be moved in three-dimensional space. In one embodiment, a unitary display comprises a plurality of closely spaced individual displays which are mounted to movable display mounts, whereby the configuration of the unitary display may be altered by changing the position of one or more of the displays relative to the others.

14 Claims, 2 Drawing Sheets

ROBOTICALLY CONTROLLED DISPLAY

FIELD OF THE INVENTION

The present invention relates to an electronic display.

BACKGROUND OF THE INVENTION

Electronic displays are now extremely common and are utilized in a variety of environments. Such displays were initially used primarily in television sets and to with computers. Initially, these displays were primarily CRT type displays which were large and bulky.

In recent years, other display technologies have been developed. Plasma, LCD, LED and other types of displays are now commercially produceable in large display sizes. At the same time, however, these displays are generally thin, thus taking up much less space than CRT type displays offering the same display area.

As such, these displays are now utilized for a variety of purposes. For example, large displays are used at stadiums to present replays of sporting events. These types of displays are also sometimes mounted to walls in stores to present advertising information.

In order to attract attention to advertising, graphic information may be presented on the displays. This information may comprise exciting patterns, such as in bright colors, flashing effects and the like, to draw attention to the display. Still, these displays may be overlooked and advertisers and other users of these displays continue to seek new ways to use these displays and increase their viewership.

SUMMARY OF THE INVENTION

The invention is a movable display and a method of moving one or more displays.

One embodiment of the invention is a movable display mount. The display mount is configured to support one or more displays and move the one or more displays in at least two dimensions or directions, and preferably in three-dimensions. In one embodiment, the display mount comprises a base and a movable display support. The base supports the display support, such as by resting upon a support surface or by connection to a support, such as a wall or other element.

The display support is movable in at least two, and preferably three, dimensions, whereby one more displays connected thereto are so movable. In one embodiment, the display support comprises a plurality of members which are movably connected to one another in one more directions/dimensions. The display support may comprise, for example, a robotic arm having a base, a main support which is rotatable relative to the base, a lower arm which is rotatable relative to the main support, an upper arm which is rotatable relative to the lower arm, and a head to which the one or more displays are connected, the head movable relative to the upper arm.

In one embodiment, means are provided for moving the display support. Preferably, the means permits the display support to be "automated" in the sense that it can be moved without direct physical contact by a human therewith. This means may comprise one or more electric motors or the like.

In another embodiment of the invention, a unitary display may comprise two or more individual displays. One or more display mounts may be utilized to move one or more all of the displays of the unitary display. For example, each display of a unitary display comprising a plurality of displays may be associated with its own display mount, thus permitting all of the displays of the unitary display to be moved independently.

One embodiment of the invention is a system including a movable display and a controller. The controller may be configured to accept input from a user and/or run control programs for generating instructions or output signals which may be used to control the display mount, including to cause the display mount to move its associated display(s).

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises one or more robotically-controlled electronic displays and methods of using robotically controlled displays, such as methods of moving one or more displays of a group of displays.

Figure 1:
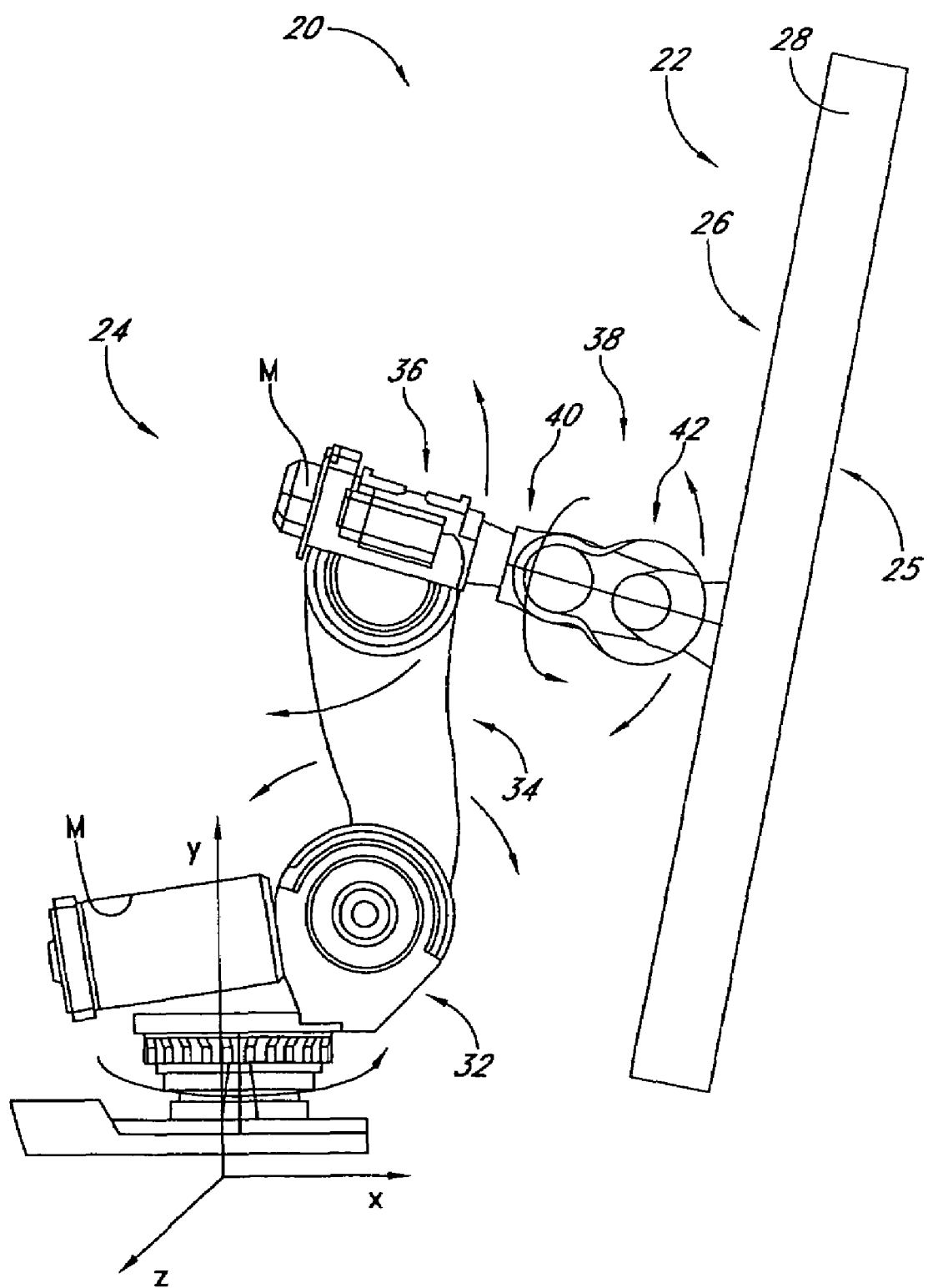
FIG. 1 is a side view of an electronic display supported by a movable display mount in accordance with an embodiment of the invention.

FIG. 1 illustrates a robotically controlled electronic display 20 in accordance with an embodiment of the invention. As illustrated, the robotically controlled electronic display 20 comprises at least one electronic display 22 and a moveable display mount 24. In a preferred embodiment, the electronic display 22 is a thin-panel type display, such as an LCD, LED, plasma or similar display (whether now known or later developed). In one embodiment, the electronic display 22 has a front or viewing side 25 and an opposing rear side 26. The electronic display 22 has a peripheral edge 28.

In one embodiment, the electronic display 22 is generally rectangular in shape, but the display 22 may have a variety of shapes. The electronic display 22 may have a display area at the front side 25, which display area is enclosed by a bezel, frame or the like. The display area comprises the portion of the electronic display 22 which is capable of displaying information.

In a preferred embodiment, the electronic display 22 is relatively large, such as for viewing by person situation remotely therefrom. The electronic display 22 may be 20 inches in diagonal size (of display area), more preferably at least 36 inches in diagonal size, and even more preferably a least 50-60 inches or more in diagonal size.

The electronic display 22 is supported by the display mount 24. In a preferred embodiment, the display mount 24 is moveable, thus permitting the position of the electronic display 22 to be changed. In a preferred embodiment, the display mount 24 is a robotic arm which can change the position of the display in at least two (2), and preferably three (3), dimensions.

FIG. 1 illustrated one embodiment of a display mount 24. In one embodiment, the display mount 24 comprises a base and a display support. The base is configured to connect or support the display mount and associated display to a support, and the display support is preferably movable relative to the base, thus permitting an associated display to be movable relative to the base and the associated support.

Referring to FIG. 1, the base 30 may have a variety of configurations, including various shapes and sizes. In general, the base 30 is configured to be mounted to or supported by a support surface, such as a wall, floor or other support, such as a portion of another object. The base 30 may have a generally planar bottom or lower surface for engaging a generally planar support surface, or may have other configurations for engaging support surfaces of other shapes. In one embodiment, the base 30 may include one or more apertures for accepting fasteners which are placed into engagement with the support surface, for securing the base 30 in a fixed position by temporarily or permanently connecting the base 30 to that surface.

In a preferred embodiment, a movable support is positioned between the base 30 and the electronic display 22. This support is preferably moveable in at least two (2), and more preferably three (3), dimensions. By "two" or "three-dimensions" it is preferably meant the standard Cartesian two or three-dimensional space, such that the support is capable of moving the display about, or relative to, at least two of an "x", a "y" and a "z" axis.

As illustrated, in one embodiment, the robotic arm includes a main support 32. In one embodiment, the main support 32 is mounted for rotation relative to the base 30, i.e. about the "y"-axis as illustrated in FIG. 1. The main support 32 may be mounted, for example, on a bearing supported shaft which is connected to the base 30, or by other means.

In one embodiment, a lower arm 34 is rotatably mounted to the main support 32. As illustrated, the main support 32 has a first portion mounted to the base 30 and a second portion to which the lower arm 34 is mounted. In a preferred embodiment, the lower arm 34 is rotatably mounted to the main support 32 about a shaft or other mount. In the configuration illustrated, the lower arm 34 is mounted for rotation about a "z"-axis (i.e. an axis which is generally perpendicular to the axis about which the base 30 rotates).

As further illustrated, an upper arm 36 is rotatably mounted to the lower arm 34. In one embodiment, a first or distal portion of the lower arm 34 is mounted to the main support 32, and the upper arm 36 is mounted to a top or proximal portion of the lower arm 34. In one embodiment, the upper arm 36 is also mounted for rotation about the "z" axis.

In one embodiment, a head 38 is located at a distal portion of the upper arm 36. Preferably, the display 25 is mounted to the mount 24 via the head 38. In one embodiment, the head 38 is mounted for rotation relative to the upper arm 36 (and thus the remainder of the mount 24). In one configuration, a first portion 40 of the head 38 is mounted for rotation about an "x" axis relative to the upper arm 36 (i.e., about an axis which is perpendicular to both the "y" and "z" axes, and thus about an axis which is generally perpendicular to the axis about which the main support 32 and upper and lower arms 36,34 rotate).

Further, in the embodiment illustrated, a second portion 42 of the head 38 is mounted for rotation relative to the first portion 40 and the upper arm 36, about the "z"-axis. As illustrated, the display 22 is mounted to the second portion 42 of the head 38.

The various portions of the mount 24 may be connected to one another in a variety of fashions. For example, the various portions may be connected to one another via a shaft and bearing mount, where the shaft is connected to one component and engages one or more bearings supported by the other component, such that the shaft may move relative to the bearing(s), thus permitting the components to move relative to one another. The portions of the mount 24 might be mounted to one another in other fashions, however, such as by hinged mounting or the like.

Preferably, the mount 24 includes means for moving the one or more portions thereof, and thus the display 22 connected thereto. As illustrated, the mount 24 may include one or more motors M for moving the components thereof. The motors M may be electrical motors. In other embodiments, hydraulics or other means may be utilized to move one or more of the components of the mount 24. For example, a hydraulic arm might be utilized to move the upper arm 36 relative to the lower arm 34 in an up and down direction.

In one embodiment, the display 22 may be detachably connected to the mount 24, such as to permit the display 22 to be changed or serviced. The display 22 might be connected to a supporting frame, for example. That frame might then be connected to the mount 24, such as by connecting the frame to the head 38 with one or more fasteners.

As indicated, in a preferred embodiment, the mount 24 is configured to move the display 22 in three-dimensions, or combinations thereof. The particular configuration of the mount 24 may vary for accomplishing this task. For example, while the mount 24 described above is "redundant" in its capacity to move in certain directions (i.e. the upper and lower arms 36,34 are both configured to move about the "z" axis), the mount 24 could be configured in other fashions (such as by having only a single portion configured to move in each direction). It will also be appreciated that the number of members or elements which the display mount comprises may vary. For example, the display mount might comprise a base and a head which is mounted to the based, such as via a swivel, permitting the head to be moved in at least two dimensions. Various configurations of members may also be utilized to effect movement in various directions. For example, aside from swivels or the rotating connections of the display mount illustrated in FIG. 1, members may be configured to telescope, slide or otherwise move linearly, or be configured to move along paths other than curved paths.

In the embodiment illustrated, a single display 22 is connected to a single mount 24. In another embodiment of the invention, referring to FIG. 2, a unitary display 122 may comprise a plurality of individual or independent displays 22 located in proximity to one another. In one embodiment, one or more of those individual displays 22 may be mounted to a mount 24, and thus be configured for movement.

Figure 2:
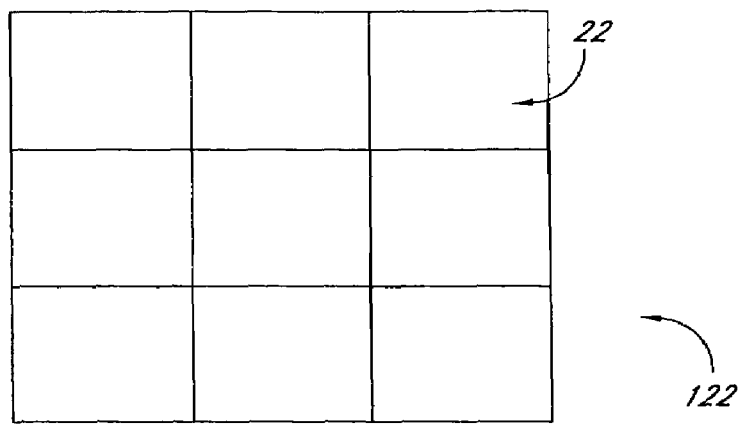
FIG. 2 illustrates a unitary display comprising a plurality of individual displays in accordance with another embodiment of the invention.

FIG. 2 illustrates one embodiment of a unitary display 122 comprising nine (9) displays 22. All nine displays 22 are preferably mounted to an associated mount (not shown). In this manner, each of the nine displays 22 may be moved by their associated mount.

FIG. 2 illustrates the displays 22 in an orientation where they are located adjacent to one another in a matrix, and in a common plane. In the configuration illustrated, there is a central display surrounded by top, bottom, side and corner displays.

Figure 3:
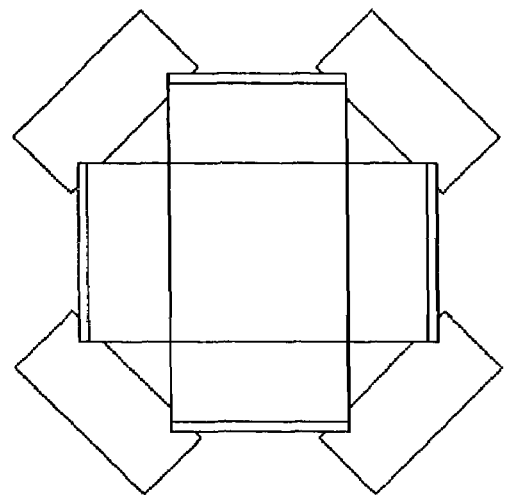
FIG. 3 illustrates the unitary display of FIG. 2 with various of the individual displays moved into different positions.

The displays 22 may be moved, however, to other locations and thus other orientations or positions relative to one another. For example, FIG. 3 illustrates the displays 22 in a "flower" configuration where the top, bottom and side displays are tilted forward relative to the plane which contains the central display. The corner displays are rotated and then similarly tilted inwardly. In this configuration, the displays are positioned like the slightly closed pedals of a rose or other flower.

Figure 4:
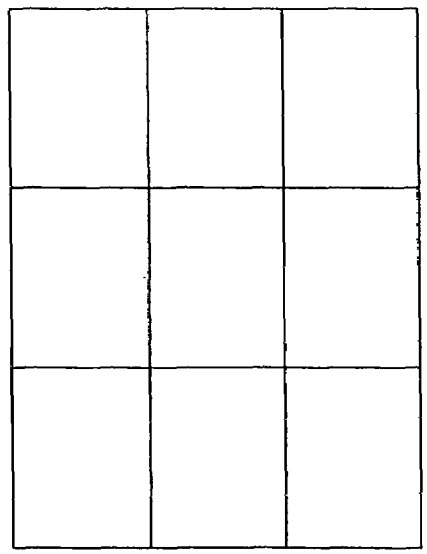
FIG. 4 illustrates the unitary display of FIG. 2 with the individual displays moved into different positions.

FIG. 4 illustrates the displays 22 again arranged in a matrix and in a single plane. However, in this configuration, the displays 22 have all been rotated 90 degrees, so that the unitary display 122 is taller than wider.

In one embodiment, each display 22 of the unitary display 122 has an associated mount. In this manner, each display 22 may be moved independently of the other. In another embodiment, multiple displays may be coupled to or otherwise associated with a single mount (such that groups of displays are movable together). In yet another embodiment, one or more of the displays 22 may be fixed and others may be connected to a mount 24 for movement.

In one embodiment, means may be provided for controlling a single mount (such as illustrated in FIG. 1) or one or more or all of a plurality of mounts associated with a unitary display (such as illustrated in FIG. 2). In one embodiment, one or more mounts may be controlled by a controller. The controller might comprise, for example, an electronically or mechanically operated controller.

In a preferred embodiment, the controller may comprise or include a computing device. Various instructions may be provided from the controller to the one or more mounts, causing the mounts to move. For example, a user might provide an input to the controller, which input is a request to move a particular display from a first to a second position. The controller may generate one more signals or instructions which are transmitted to the required mount for causing the mount to so move the display. The signal might comprise opening of a switch which allows electricity to flow to one or more motors for a predetermined period time which is necessary for the motor to effect the desired movement. In another embodiment, the signal might comprise an instruction which is received by sub-controller of the mount, which sub-controller then causes the mount to move as desired.

In one embodiment, the controller may be configured to cause a single mount or multiple mounts to move in various patterns or other desired directions. For example, the controller might be programmed to cause the displays to move in a particular pattern. Referring to FIGS. 1 and 2, for example, the controller may be configured to move the displays from the position illustrated in FIG. 1 to that illustrated in FIG. 2, or vice versa. The controller may be custom-programmed or might be configured to execute pre-set sequences of movement. For example, the displays may be configured to move at certain times, into certain positions or in certain patterns, to move with music or the like.

In one embodiment, the controller may include a processing unit capable of executing machine readable code or "software." As indicated, that software may comprise a set of instructions which, when executed, cause the controller to move one or more displays in a predetermined motion or pattern, randomly or otherwise. The software might also or instead simply comprise a set of instructions which permits a user to provide manual input to cause a display or displays to move, either in direct response thereto or to generate a "programmed" movement (which may be implemented immediately or be stored for implementation at a later time).

The controller might communicate with the display mount via wired or wireless communications. For example, the controller might comprise a desk-top computer running a control program. The desk-top computer might transmit signals via a RS-232 communication link including a wired pathway to the motor or controller of the display mount. Alternatively, the desk-top computer and display mount controller might both include wireless transceivers. In this manner, the controller and display mount(s) may be located remotely from one another.

In one embodiment, video information may be transmitted to the display or displays either independently of control instructions or dependently therewith. For example, the controller may be configured to both generate display information and/or transmit display information to the displays, and control the mounts. The controller might be configured to move the mounts/displays based upon the information which is displayed by the one or more displays. In one embodiment, the one or more displays may be moved synchronously with information displayed by the displays.

The invention has numerous advantages. One aspect of the invention is a movable display. The display may preferably be moved in three-dimensions (i.e. about three axes which are all perpendicular to one another). In one embodiment, the display is mounted to a display mount having a display support which is movable in three dimensions. Preferably, means are provided for automatically or remotely moving the display. As indicated, this may comprise changing the position of one or more portions of the display mount.

One aspect of the invention is a method of remotely or automatically changing the position of a display. For example, a display may be mounted to a wall or ceiling in a public area and the position of that display may be changed at various times in an automatic fashion (as opposed to "manual" manner, where the position is changed by a person physically moving the display or its associated mount). This has the advantage that the position of a display may be moved for various purposes, such as for entertainment, for optimizing viewing angle, for directing information to viewers in certain locations or areas, or for other reasons.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A robotically controlled video display system comprising:
    a robotic display mount comprising:
        a base configured to mount to a support surface;
        a moveable support mounted to said base, said moveable support comprising at least a first portion, a second portion and a third portion, each of said first, second and third portions movable relative to one another and each portion moveable about at least one axis, whereby said moveable support is configured to move about each of an x axis, a y axis and a z axis which are all perpendicular to one another; and
        at least one motor configured to move said first, second and third portions of said moveable support;
    an electronic video display capable of displaying visual information in response to an input, said display mounted to said moveable support for movement by said robotic display mount; and
    an electronic controller configured to control said at least one motor to move said moveable support;
    whereby said display is movable in the three dimensions about said x axis, y axis and z axis.

2. The robotically controlled video display system in accordance with claim 1 wherein said first portion of said moveable support comprises a main support rotatable relative to said base about at least said y axis, said second portion comprises an arm mounted to said main support and moveable about at least said z axis, and said third portion comprises a head mounted to said arm and moveable about at least said x axis.

3. The robotically controlled video display system in accordance with claim 2 wherein said display is mounted to said head of said moveable support.

4. The robotically controlled video display system in accordance with claim 1 wherein said base is mounted to a wall or ceiling of a building.

5. The robotically controlled video display system in accordance with claim 1 further including machine readable code executable by said electronic controller to cause said at least one motor to move said moveable support to move said display in a pre-selected pattern of movement in said three dimensions.

6. The robotically controlled video display system in accordance with claim 5 wherein said machine readable code is configured to cause said controller to move said moveable support with music.

7. The robotically controlled video display system in accordance with claim 5 wherein said machine readable code is configured to cause said controller to move said moveable support synchronously with information displayed by said display.

8. A robotically controlled video display system comprising:
   a first robotic display comprising:
      a first robotic display mount comprising a base and a moveable support, said moveable support having one more portions moveable about at least an x axis, a y axis and a z axis which are perpendicular to one another;
      at least one first motor configured to move said moveable support; and
      a first electronic video display capable of displaying visual information to an input, said display mounted to said moveable support for movement by said first robotic display mount; and
   at least a second robotic display comprising:
      a second robotic display mount comprising a base and a moveable support, said moveable support having one more portions moveable about at least an x axis, a y axis and a z axis which are perpendicular to one another;
      at least one second motor configured to move said moveable support; and
      a second electronic video display capable of displaying visual information in response to an input, said display mounted to said moveable support for movement by said second robotic display mount;
   said first and second robotic displays positioned adjacent one another; and
   an electronic controller configured to control said at least one first motor and said at least one second motor to move said first and second electronic displays independently of one another in the three dimensions about said x axis, said y axis and said z axis, whereby said first and second electronic displays may be moved to a position adjacent one another to form a unitary display, or may be moved to various positions apart from one another into various patterns.

9. The robotically controlled video display system in accordance with claim 8 wherein said system comprises nine robotic displays each having an associated electronic display.

10. The robotically controlled video display system in accordance with claim 9 wherein said electronic displays of said nine robotic displays may be moved into a position forming a matrix of electronic displays.

11. The robotically controlled video display system in accordance with claim 10 wherein said matrix has three rows and three columns.

12. The robotically controlled video display system in accordance with claim 8 wherein said electronic controller is configured to automatically move said first and second electronic displays in a pre-programmed pattern.

13. The robotically controlled video display system in accordance with claim 8 wherein said electronic controller is configured to move said first and second electronic displays synchronously with information displayed by said displays.

14. The robotically controlled video display system in accordance with claim 8 wherein said first and second robotic display mounts comprise a base and a moveable support connected to said base and moveable relative to said base.

* * * * *

UNITED STATES PATENT AND TRADEMARK OFFICE
CERTIFICATE OF CORRECTION

PATENT NO.        : 7,545,108 B2                                           Page 1 of 1
APPLICATION NO. : 11/700535
DATED             : June 9, 2009
INVENTOR(S)       : Flessas It is certified that error appears in the above-identified patent and that said Letters Patent is hereby corrected as shown below:

On title page add Item (63)
-- Related U.S. Application Data --
-- U.S. Provisional Application No. 60/763,669, filed on January 31, 2006 --

Signed and Sealed this

Twenty-second Day of December, 2009

David J. Kappos
*Director of the United States Patent and Trademark Office*